Jan. 3, 1939.   R. A. HETZER   2,142,726
METHOD OF FILTERING AND PURIFYING LIQUIDS
Filed April 3, 1935
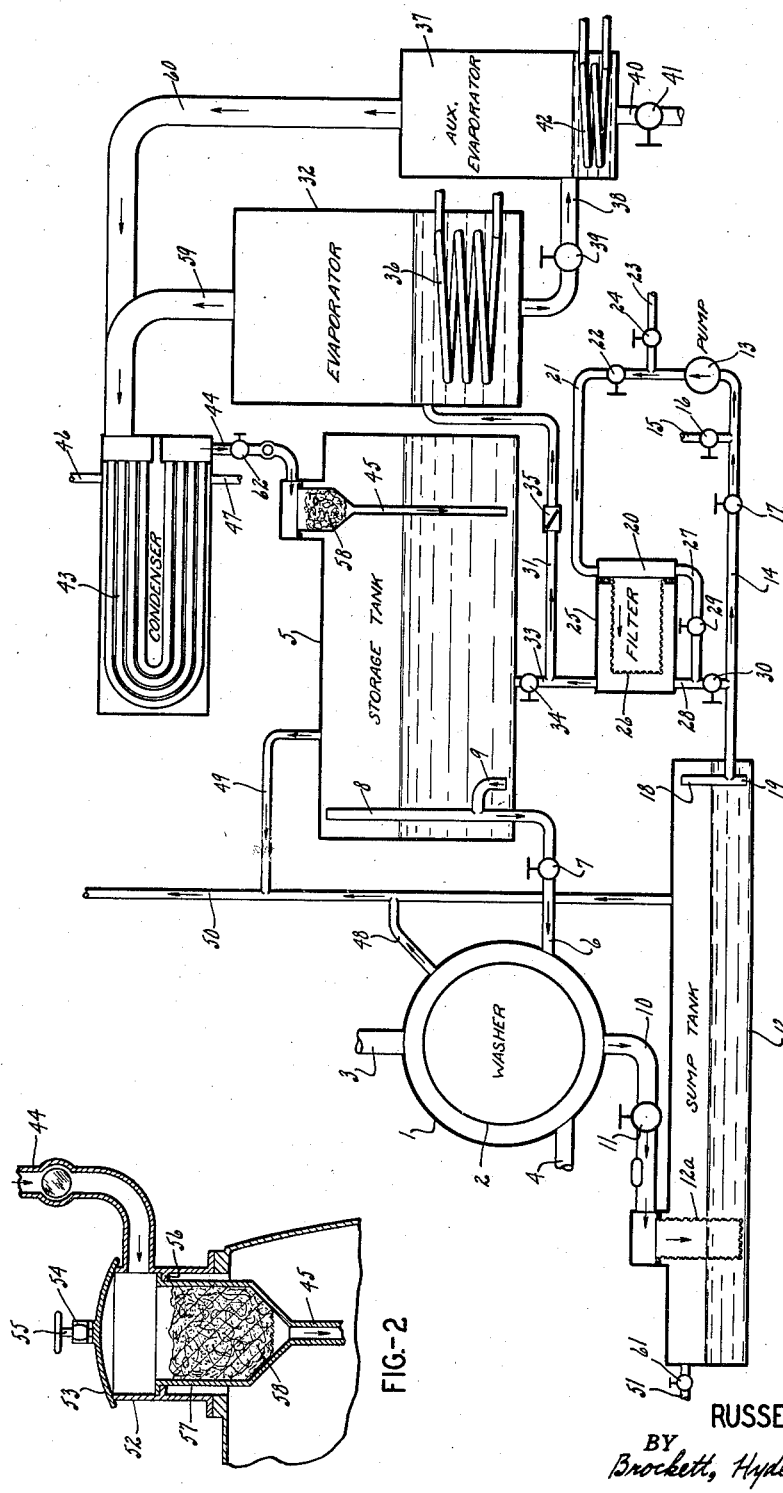
INVENTOR
RUSSELL A. HETZER
BY
Brockett, Hyde, Higley & Meyer
ATTORNEYS Patented Jan. 3, 1939

2,142,726

UNITED STATES PATENT OFFICE 2,142,726

METHOD OF FILTERING AND PURIFYING LIQUIDS

Russell A. Hetzer, Cincinnati, Ohio, assignor to The American Laundry Machinery Company, Cincinnati, Ohio, a corporation of Ohio Application April 3, 1935, Serial No. 14,457

3 Claims. (Cl. 202—71)

My invention relates to dry cleaning systems which utilize a volatile solvent composed of or including a compound containing chlorine as the detergent, and more particularly to a method of removing the foreign matter from the detergent after the treating operation, whereby the solvent may be employed in subsequent operations. This application is a continuation in part of application Serial No. 462,061, filed June 18, 1930, now Patent Number 2,041,711, issued May 26, 1936.

The method of treating fabric in dry cleaning systems consists in employing a solvent having a low boiling point and agitating the fabric with a pool of the solvent to remove dirt and foreign matter from the fabric and cause its transfer to the solvent. In such systems it is desirable to repeatedly use the same solvent and to have the solvent equally effective in each operation. Solvents formed by the chlorination of hydrocarbons, such as carbon tetrachloride, ethylene dichloride, propylene dichloride, or a mixture of such compounds, are particularly suitable because they are not inflammable, have good solvent properties, and fabric treated therewith may be easily deodorized.

Solvents containing chlorine, such as carbon tetrachloride, react with water to form hydrochloric acid and in renovating the used solvent for reuse in the treating operation it is highly desirable to remove as much water and hydrochloric acid as possible. This is particularly true of hydrochloric acid which if present in substantial amount in the treating solution, not only deteriorates the fabric being treated but also attacks metal or other parts of the treating vessel.

In renovating solvents containing chlorine, such as carbon tetrachloride, I have found that the carbon tetrachloride reacts with water to form hydrochloric acid to the greatest extent at the point where the carbon tetrachloride and water are being changed from the vaporous to the liquid state, which, in my improved apparatus, is at the time the vapors are passing through the condenser following the evaporation step.

It is therefore an object of my invention to provide an improved reclaiming system for solvents containing chlorine wherein the water may be removed from the solvent and wherein hydrochloric acid which is formed by the reaction of the solvent and water may be neutralized. Another object of my invention is to provide an improved process of renovating solvents containing chlorine by means of which water and hydrochloric acid are removed from the solvent during the reclaiming process.

My invention will be better understood by reference to the accompanying drawing in which:

Fig. 1 is a diagrammatic view of my improved apparatus; and,

Fig. 2 is an enlarged cross sectional view showing my improved device for removing the water and hydrochloric acid.

As illustrated in the drawing, my improved renovating apparatus is shown as applied to a washer or treating vessel or tub 1 in which rotates the usual goods containing drum 2. The washer is provided with conduits 3 and 4 by means of which suitable apparatus may be connected to the treating vessel for drying and deodorizing the fabric, as illustrated in my copending application. A storage tank 5 is mounted at a higher level than the treating vessel 1 and, as illustrated, contains a supply of volatile detergent to be utilized in the treating operation. A conduit or pipe 6 connects the bottom of the storage tank 5 with the treating compartment 1 and is provided with a valve 7 regulating the amount of treating medium which passes from the storage tank to the treating compartment.

To prevent any water or moisture which may collect and float on the surface of the treating medium within the storage tank 5 from gravitating into the treating compartment 1 through the conduit 6, the conduit 6 extends into the tank and is provided with two branches 8 and 9. The branch 8 extends upwardly to a point above the level of the treating medium within the storage tank and the branch 9 is in the form of a 90° elbow having its lower end but slightly above the bottom of the tank 5. The solvent which is supplied to the treating vessel through the conduit 6 will therefore always flow from the lowermost part of the storage tank. When valve 7 is open for supplying solvent to the treating compartment 1, the treating medium will drain from the storage tank 5 until it has reached a level which is slightly below the point of connection of the branch 8 with the branch 9. At this point the flow of treating medium will stop. As the level of solvent in the storage tank can never drop to the point of the opening of the branch 9, water or moisture floating on the surface of the treating medium will not be drained into the treating compartment.

A drain conduit 10 provided with a valve 11 leads from the bottom of the treating compartment 1 to the sump tank 12 located below the compartment. Filter means 12a are provided at the delivery end of the conduit 10 for separating particles of foreign matter.

In renovating the used treating material it is first drawn from the sump tank 12 by means of pump 13. The intake side of the pump is connected to the sump tank 12 by means of a conduit 14 which is provided with a branch conduit 15 controlled by a valve 16. The conduit 15 terminates in a free end to provide a pipe or hose connection. The conduit 14 is also provided with a control valve 17 for regulating the flow of medium from the sump tank 12 to and through the pump 13. The valve 17 is normally open and the valve 16 is normally closed. However, when a fresh supply of treating medium from some outside source is to be supplied to the apparatus the valve 17 is closed and the valve 16 is opened, at which time a pipe or hose may be attached to the pipe connection 15 and a fresh supply of medium drawn into the apparatus by the operation of the pump 13.

As illustrated in the drawing, the portion of the pipe 14 extending within the sump tank 12 terminates in a vertically extending T-connection, the upper end 18 of which is adjacent the top of the sump tank and the lower end 19 of which is adjacent the bottom thereof. By utilizing a T-connection of this type, the solvent may be withdrawn from the sump tank adjacent the bottom thereof and means are also provided for maintaining a minimum amount of solvent in the sump tank, the amount being determined by the point where the conduit 18 joins the conduit 14.

As a first step in the circulation of the treating medium from the sump tank 12, the medium is passed into a filter 20 by way of a conduit 21 leading from the discharge side of the pump 13, the conduit being controlled by the valve 22. A pipe or conduit 23 under control of valve 24 leads from the conduit 21 and terminates in a pipe or hose connection. Normally when the apparatus is in operation, valve 24 is closed and valve 22 is open. However, if for any reason it is necessary to empty the system of the treating medium, valve 22 is closed, valve 24 is opened and a suitable hose or pipe is attached to the connection 23, whereby the solvent may be discharged from the system.

The filter 20 comprises a cylindrical outer shell 25 and a filter bag 26. Conduits 27 and 28 controlled by valves 29 and 30 connect the exterior and inner portion of the filter with the sump tank through the conduit 14. Means are thereby provided for draining the filter when necessary or desirable.

A pipe or conduit 31 connects the filter to a main evaporator 32 and a branch pipe 33 under control of a valve 34 connects the filter shell with the storage tank 5 through a portion of the pipe 31. The pipe 31 is provided with a check valve 35 to prevent liquid from flowing backwardly from the evaporator 32 into the filter. The main evaporator is provided with a coil 36 through which a suitable heating fluid such as steam may be passed.

An auxiliary evaporator 37 is also provided which is connected to the main evaporator by means of a conduit 38 which is controlled by the valve 39. The auxiliary evaporator is provided so that sludge collected in the bottom of evaporator 37 may be drained from the auxiliary evaporator in desired amounts, or at desired intervals, and the solvent recovered from the sludge. It will be noted that by such an arrangement the solvent may be recovered from the sludge without discontinuing evaporation in the main vaporizer. A conduit 40 controlled by valve 41 is provided for draining the sludge from the auxiliary evaporator after substantially all of the solvent has been removed. The auxiliary evaporator is also provided with a heated coil 42 through which a suitable heating medium, such as steam, may be passed. The vapors from evaporators 32 and 37 are passed to condenser 43 through conduits 59 and 60 and the condensate flows through conduits 44 and 45 into the storage tank.

The condenser 43 is provided with suitable conduits 46 and 47 through which a suitable cooling fluid may be passed. Vent pipes 48 and 49 extending from the washer and storage tank are connected to a vent pipe 50 extending from the sump tank, thereby providing a suitable venting arrangement for the system. A conduit 51 controlled by a valve 61 also extends outwardly from the upper portion of the sump tank for removing water or moisture flowing on the surface of the solvent in the sump tank.

In accordance with my invention I have provided improved means for removing the water and particularly the hydrochloric acid which is formed in the condenser 43 from the solvent before it passes to or through the storage tank. As illustrated in detail in Fig. 2 of the drawing, the storage tank 5 is provided with an upwardly extending casing 52. A cover 53 is normally hermetically sealed upon the casing in any suitable manner, such as by means of an arm 54 attached to the casing and extending across the cover which has an opening through which a bolt 55 is threaded. The interior of casing 52 is provided with an inwardly extending annular flange 56 which supports a receptacle 57. The receptacle 57 is preferably formed integral with conduit 45.

The receptacle 57 is filled with cellulosic material 58, such as cotton or cotton waste. The cotton not only serves to absorb water which passes through the condenser but also reacts with hydrochloric acid which is formed in the condenser, thereby neutralizing the hydrochloric acid before it passes into the storage tank.

Before the cotton is placed in receptacle 57 it is preferably impregnated with a suitable alkali, such as an alkali metal or alkali earth metal oxide or carbonate. I preferably utilize a solution of sodium carbonate because it is effective and inexpensive. The cellulosic material is first soaked with the solution, is then dried, and is then placed in the receptacle. I have found that cellulosic material, such as cotton, which has been dried in this manner, is not only effective in absorbing the water but both the alkali and the cotton serve to neutralize the hydrochloric acid.

While prior to my invention it was recognized that water would react with carbon tetrachloride to form hydrochloric acid in dry cleaning systems, it was not known that this reaction takes place essentially in the condenser when carbon tetrachloride and water vapors are being condensed. By providing an improved absorbing and neutralizing device between the condenser and storage tank, it will therefore be seen that the hydrochloric acid may be removed before it reaches the storage tank. It will also be apparent that the hydrochloric acid not only will be neutralized but also that a substantial amount of water will be absorbed by the cotton. Consequently, the solvent passed to the storage tank not only will be substantially free from hydrochloric acid, but also will be practically free from water.

From the foregoing specification, it will be seen that by means of the T-connection at the bottom of the sump tank and the drain 51, as much water as possible is removed by mechanical means. However, some water becomes entrained with the solvent and is forced into the evaporators by the pump 13. During the evaporation process, the solvent and the small amount of water which is present are evaporated while the grease and dirt which were extracted from the fabric remain in the sludge.

The solvent and water vapors are then condensed. I have found, however, that when the solvent and water vapors are being changed from the vaporous to the liquid state, the solvent reacts with water to the greatest extent to form hydrochloric acid. I have therefore provided an improved purifying and absorbing device between the condenser and the storage tank by means of which the hydrochloric acid will be neutralized and water will be absorbed.

I have found that cotton waste which has been washed with an alkali and then dried is especially suitable for removing the hydrochloric acid. The alkali will of course react with the hydrochloric acid and after the alkali has all been neutralized the hydrochloric acid will react with the cotton waste itself. The cotton waste also serves to absorb water. If the cotton waste, however, should become saturated with water and some of the water should drip into the storage tank, it will float upon the solvent and will be prevented from being drained into the washer by means of the pipe arrangement 8 and 9.

It will of course be understood that cotton waste may be utilized alone although I prefer to first saturate the cotton waste with an alkali and place it in the receptacle 57. It will be noted that by providing the receptacle with a cover 53 and providing a valve 62 in conduit 44, the flow of solvent from the condenser may be shut off while a new supply of the saturated cotton waste is being inserted in the receptacle, or, the cotton waste may be removed at intervals, washed again with an alkali and again reinserted.

To those skilled in the art, many modifications and widely different embodiments and applications of my invention will suggest themselves without departing from the spirit and scope thereof. My disclosure and description are purely illustrative and are not in any sense limited.

What I claim is:

1. The method of renovating solvents composed essentially of one or more chlorine compounds in the presence of a small amount of water, the chlorine compounds being capable of reacting with the water during condensation to form hydrochloric acid, which comprises vaporizing the solvent and any water which is present to remove the solvent and water from dirt and grease, condensing the vapors and passing the condensate through cellulosic material impregnated with an alkali to remove water and hydrochloric acid from the condensate.

2. The method of renovating a solvent consisting essentially of carbon tetrachloride in the presence of a small amount of water which comprises vaporizing the solvent and water to remove the solvent and any water which is present from dirt and grease, condensing the vapors and passing the condensate through cotton waste impregnated with an alkali to remove water and hydrochloric acid from the condensate.

3. The method of renovating a solvent consisting essentially of carbon tetrachloride in the presence of a small amount of water which comprises vaporizing the solvent and water to remove the solvent and any water which is present from dirt and grease, condensing the vapors and passing the condensate through cotton waste impregnated with sodium carbonate to remove water and hydrochloric acid from the condensate.

RUSSELL A. HETZER.